US009274011B2

(12) United States Patent
Kettenbach et al.

(10) Patent No.: US 9,274,011 B2
(45) Date of Patent: Mar. 1, 2016

(54) LOAD MEASUREMENT OF THE LOAD RECEIVER OF HOISTING DEVICES

(75) Inventors: Helmuth Kettenbach, Ettlingen (DE); Robert Tordy, Hassloch (DE)

(73) Assignee: HIRSCHMANN AUTOMATION AND CONTROL GMBH, Neckartenzlingen (DE)

( * ) Notice: Subject to any disclaimer, the term of this patent is extended or adjusted under 35 U.S.C. 154(b) by 0 days.

(21) Appl. No.: 14/233,910

(22) PCT Filed: Aug. 30, 2012

(86) PCT No.: PCT/EP2012/066851
§ 371 (c)(1),
(2), (4) Date: Apr. 1, 2014

(87) PCT Pub. No.: WO2013/030269
PCT Pub. Date: Mar. 7, 2013

(65) Prior Publication Data
US 2014/0216171 A1 Aug. 7, 2014

(30) Foreign Application Priority Data
Aug. 31, 2011 (DE) .................. 10 2011 111 517

(51) Int. Cl.
*G01L 1/22* (2006.01)
*B66C 1/40* (2006.01)
*B66C 13/16* (2006.01)
*B66C 13/44* (2006.01)
*G01G 19/18* (2006.01)

(52) U.S. Cl.
CPC ... *G01L 1/22* (2013.01); *B66C 1/40* (2013.01); *B66C 13/16* (2013.01); *B66C 13/44* (2013.01); *B66F 2700/00* (2013.01); *G01G 19/18* (2013.01)

(58) Field of Classification Search
CPC ........ B66C 13/16; B66C 13/44; G01G 19/18; G01G 23/3735; G01L 1/00
See application file for complete search history.

(56) References Cited

U.S. PATENT DOCUMENTS

| 3,826,321 | A | * | 7/1974 | Rigney et al. | ............. 177/210 R |
| 3,878,477 | A | * | 4/1975 | Dias et al. | ........................ 331/40 |
| 6,150,900 | A | * | 11/2000 | Kadota et al. | ................. 333/133 |
| 6,810,750 | B1 | * | 11/2004 | Kiefer et al. | .................... 73/801 |

(Continued)

FOREIGN PATENT DOCUMENTS

| DE | EP 2332877 | * | 8/2012 | ............. B66B 13/16 |
| EP | 2123591 A | | 11/2009 | |

(Continued)

OTHER PUBLICATIONS

EP 2332877.*

*Primary Examiner* — Lisa Caputo
*Assistant Examiner* — Tran M Tran
(74) *Attorney, Agent, or Firm* — Foley & Lardner LLP

(57) ABSTRACT

Device for determining the force of an operational arrangement acting on a load receiver, wherein the load receiver is arranged movably relative to a component of the operational arrangement, wherein sensor means are provided, determining the force acting on the load receiver, wherein transmission means are provided, which wirelessly transmit a signal representing the force generated and emitted by the sensor means to a control device of the operational arrangement, and wherein energy supply means providing the power supply at least for the sensor means and/or for the transmission means are provided on the load receiver.

11 Claims, 1 Drawing Sheet

(56) References Cited

U.S. PATENT DOCUMENTS

| | | | |
|---|---|---|---|
| 7,053,319 B2 * | 5/2006 | Kats et al. | 177/210 FP |
| 8,618,949 B2 * | 12/2013 | Maynard et al. | 340/685 |
| 8,628,518 B2 * | 1/2014 | Blumenkranz et al. | 606/1 |
| 8,635,758 B2 * | 1/2014 | Slepecki et al. | 29/525.02 |
| 8,919,231 B2 * | 12/2014 | Butler et al. | 83/58 |
| 2008/0073129 A1 * | 3/2008 | Heuer | 177/136 |
| 2010/0087835 A1 | 4/2010 | Blumenkranz | |
| 2013/0103271 A1 * | 4/2013 | Best et al. | 701/50 |

FOREIGN PATENT DOCUMENTS

| | | | |
|---|---|---|---|
| EP | 2332877 | * | 6/2011 |
| EP | 2332877 A | | 6/2011 |
| JP | 2006250582 A | | 9/2006 |
| SU | 587089 A | | 10/1975 |

* cited by examiner

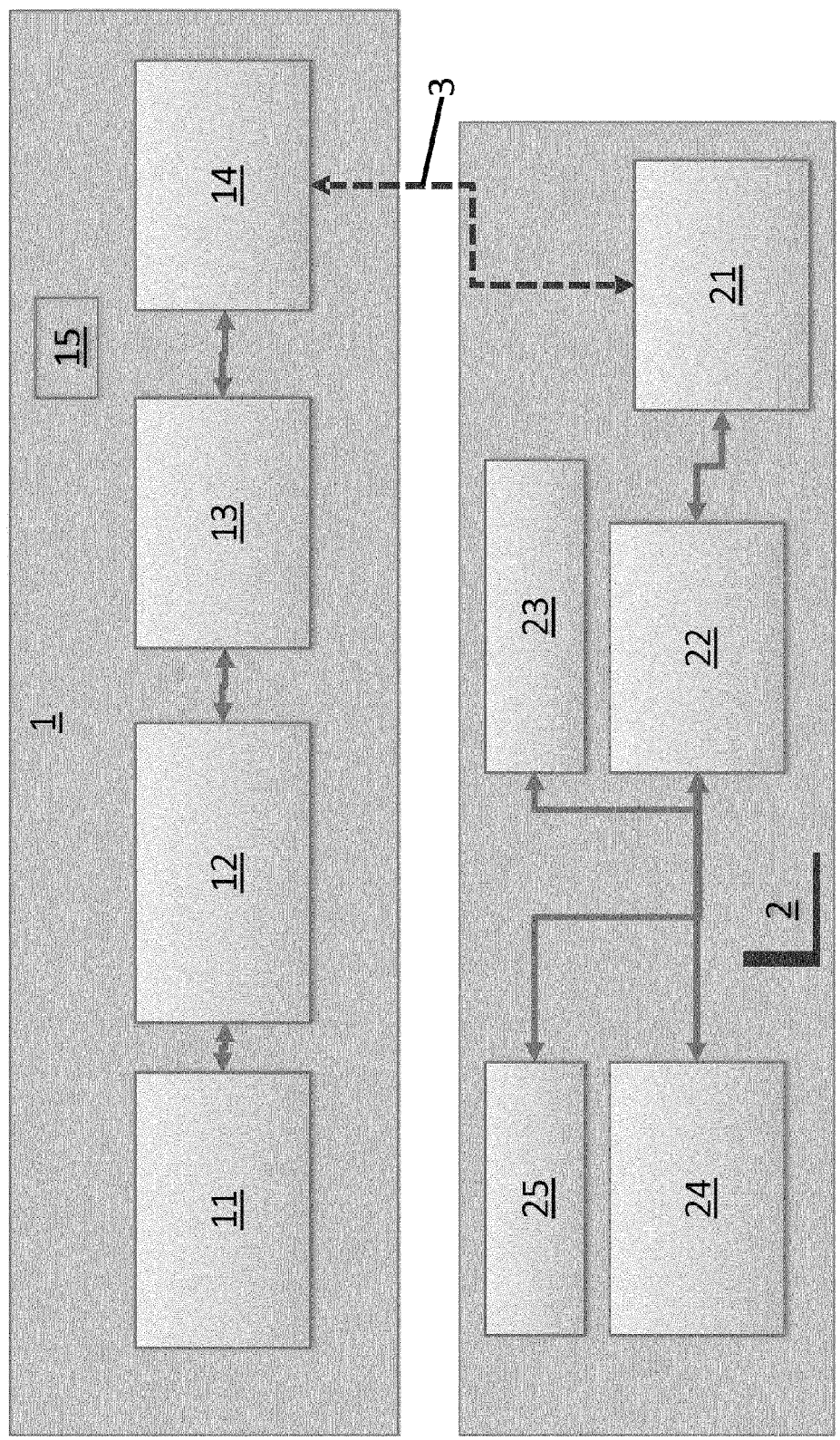

LOAD MEASUREMENT OF THE LOAD RECEIVER OF HOISTING DEVICES

CROSS REFERENCE TO RELATED APPLICATIONS

This application is the US-national stage of PCT application PCT/EP2012/066851 filed 30 Aug. 2012 and claiming the priority of German patent application 102011111517.3 itself filed 31 Aug. 2011.

The invention relates to a method and apparatus for determining the force of a lifting apparatus, such as, for example, a hoist, a crane, or the like, which force acts on a grab, as set forth in the features of the characterizing clauses of the independent claims.

This invention, in particular, relates to direct measurement on a grab of mobile machines, such as, for example, cranes. It also applies, however, to stationary equipment. The grab typically is a hook or other comparable mechanical device.

When operating a lifting apparatus, it is absolutely critical in terms of safety-relevant aspects to be able to determine the force acting on the grab if the grab is movable relative to a component of the lifting apparatus and is also moved. When operating a lifting apparatus, in particular, operating a crane, it is furthermore important—in particular, in terms of safety aspects relating to load torque limitation and the range of operation—to know the force acting on the grab, in particular, the load suspended from the grab (hook) that is to be transported. In addition, it is obviously also important to know other parameters, such as, for example, the angle of attack for the boom of the crane, the length of the boom, wind speeds, temperatures, or the like. The operation of the lifting apparatus, in particular, its range of action and its load torque limitation are determined based on all of these determined or manually entered values, in particular, operating parameters. This means that there is a safe range of action and an unsafe range of action for the lifting apparatus. The operating parameter of the force acting on the grab here is one of several parameters, yet at the same time it is also a significant operating parameter. This is because if, for example, use of a crane means that the load suspended on the hook would cause the crane to tip over as a function of boom length and as a function of the angle of attack for the boom, it is absolutely critical for a controller to prevent this load from either being moved further or even being picked up in the first place based on a determination of the load acting on the grab.

As a result, it is absolutely critical to determine the load acting on the grab.

Methods and apparatuses are already well-known that function to determine the load a lifting apparatus is exerting on a grab, the load not being determined directly at the grab but instead indirectly based on other determined or specified operating parameters for the lifting apparatus. Although this functions in a reasonably satisfactory manner, the disadvantage still exists that the indirectly determined force acting on the grab is very imprecise and thus varies over a high tolerance range. Under certain circumstances, this can result in delays in determining the operating parameters used to indirectly calculate the load, and this means that this indirectly determined load is not always representative of the actual load. In addition, the determination of those operating parameters needed to effect the indirect load measurement can at times entail considerable cost and complexity.

The object of the invention is therefore to provide a method and apparatus for determining a force acting on a grab of a lifting apparatus, by which method or apparatus the load can be determined rapidly and straightforwardly, and can be provided for further processing in a controller.

This object is achieved by the features of the independent claims.

The apparatus according to the invention has a sensor that determines the force acting on the grab and a transmitter that wirelessly transmits a force-representing signal generated and supplied by the sensor to a controller of the lifting apparatus, and a power supply provided on the grab furnishes the electrical power supply at least for the sensor and/or the transmitter.

Unlike the prior art where the load has to be determined is indirectly from other parameters, the sensor mounted directly on the grab determines the force acting on the grab so as to enable the load to be determined directly at the point of origin of the applied load. As a result, the force acting on the grab is delivered very rapidly, and also reliably and accurately. The sensor supplies a signal that represents the force on the grab. Since the grab is movable relative to a component of the lifting apparatus, provision is furthermore made whereby the transmitter transmits the signal supplied by the sensor wirelessly to a controller of the lifting apparatus. This then eliminates cables that either could not be employed at all between the grab and the component of the lifting apparatus, or would be subject to considerable wear. In practical situations it is thus not possible to transmit signals through cable connections if the grab is a hook carried on a hook cable and the hook cable is routed at one end through a deflection pulley at one tip of the crane's boom. The sensor and/or the transmitter typically require a power supply; however, it is also difficult if not impossible to run power from the lifting apparatus to the grab due to the relative motion between the grab and the component of the lifting apparatus. For this reason, the power supply is also advantageously provided on the grab and supplies the electrical power at least for the sensor and/or the transmitter. As a result, the grab together with the sensor, transmitter, and power supply advantageously constitute a separate unit that can determine the force acting on the grab rapidly, reliably, and most importantly directly, then transmit it to a controller of the lifting apparatus. Depending on the type of transmitter, the transfer of the sensor signals does not necessarily have to be effected to a controller that is in or on the lifting apparatus; instead, it is optionally also possible for the transfer to be effected to an independent controller that is not in or on the lifting apparatus.

In a development of the invention, the sensor and/or the transmitter are designed to determine the force by surface-acoustic-wave technology, and/or to transmit the signal by surface-acoustic-wave technology. This then advantageously provides a technology by which the force acting on the grab and/or the signal representing the load can be transmitted to the controller through the components of the lifting apparatus.

As an alternative or supplement to the SAW technology, the sensor can be provided a strain gauge. Also alternatively or in addition the transmitter can be a wireless transceiver, such as, for example, ones based on the IEEE-802-Standard (in particular, the WLAN). Each alternative embodiment has the advantage of employing conventional technologies, such as the referenced strain gauges, first of all to determine the force acting on the grab. Wireless transmission is thus also available as a proven alternative means for transmitting the sensor signals, replacing the SAW technology. In addition, however, it is also possible to use the SAW technology redundantly, or the strain gauges redundantly, or the SAW technology in parallel with the strain gauges, in order to determine the force acting on the grab. These variants have the advantage that the force acting on the grab is determined redundantly. This is typically implemented by using two of the same measurement principles (for example, providing two strain gauges) or by using two different measurement principles (for example, both the SAW technology and the strain gauges). This ensures that the force acting on the grab is determined reliably so as to comply with safety-relevant aspects. The same applies as well to the transmission links and/or transmitter. Here too it is possible to redundantly employ two of the same technologies (for example, SAW technology or the wireless transmission technology redundantly), or two different transmission links and/or transmitters redundantly (for example, SAW technology both through components of the lifting apparatus and also the wireless transmission technology). The sensor technology and transmission technology described above with reference to the sensor and transmitter are provided only by way of example and are not limited to these; it is thus also possible to employ other sensors or other transmitters alternatively or in addition to the above-described technologies.

In a development of the invention, the power supply is a battery, rechargeable battery, or solar cell on the grab. This list is also not restrictive, and other power supplies can be considered that are able to and designed to provide the power supply at least for the sensor and/or the transmitter directly on the grab. The use of a battery has the advantage that a battery is durable and can be replaced quickly. Since the latter entails fixed costs, a possible alternative is to use a rechargeable battery that can be repeatedly recharged to provide power on the grab. Since charging these rechargeable batteries may involve limitations on time of use for the lifting apparatus, another possible approach is to provide a solar cell as the power supply. This type of solar cell essentially ensures there is a permanent power supply. If this solar cell is not delivering power due to darkness, shading, or the like, proven approaches may be used whereby an energy storage system (for example, rechargeable battery, capacitor, or the like) is provided as a buffer.

The above embodiments related in general to a lifting apparatus that includes a grab where a force acts on the grab and the grab is movable relative to the component of the lifting apparatus. An especially advantageous application of the apparatus and/or the method according to the invention is with a mobile or stationary crane where the grab is a hook disposed on a crane cable and the hook can be moved relative to the boom by the crane cable through a boom of the crane. Examples of mobile cranes include truck-mounted cranes, while examples of stationary cranes include lattice-boom cranes that can be erected on construction sites, harbor cranes, or the like. The grab does not necessarily always have to be a single hook but can also be an application-specific grab (for example, for picking up containers). Similarly, the component of the lifting apparatus, in particular, the crane, does not always have to be a boom but can also relate to another component. The same is true for the crane cable that can be provided in single form, but also frequently in multiple form (using the pulley-block principle).

An apparatus for carrying out the method is shown in the sole FIGURE and described below.

The FIGURE is a schematic view of a grab 1 with its components, and a lifting apparatus 2 with its components, in particular, a controller for operating the lifting apparatus.

The grab 1 comprises, in addition to components not shown (such as, for example, the actual loading hook) sensor 11 in which technologies such as DMS (strain gauges), SAW (surface-acoustic-wave) or others are used to determine the force acting on the grab 1. The sensor 11 feeds a signal to a unit 12, in particular, an analog and/or digital evaluation unit. A data processor 13 can be, but does not have to be, connected to the evaluating unit 12. This data processor 13 can perform a plausibility test, for example, on the output signals from the sensor 11 or from the evaluating unit 12. The output signals from the sensor 11 or from the evaluating unit 12 or (as shown here) from the data processor 13 can be sent to the input of the transmitter 14. The transmitter 14 is used to wirelessly transmit from the sensor 11 signals that represent the force acting on the grab through a link 3 to a corresponding data receiver 21 in the controller of the lifting apparatus 2. This means that the transmitter 14 and the data receiver 21 in fact respectively have receivers and transmitters for the two-way wireless transfer of data by radio transmission. These are eliminated if the data transmission uses SAW technology. The data received by the data receiver 21 may be, but do not have to be, fed to a data preprocessor 22. Either the output signals from the data receiver 21 or from the data preprocessor 22 are sent to a controller 23 of the lifting apparatus in order to operate it. Since the principle is essentially well known by which lifting apparatuses are operated based on received operating parameters (although by an indirect load measurement previously), no further description is needed here. The data from the data receiver 21 (or from the data preprocessor 22) can also be fed to an overload protector 24 (for example, a torque limiter). This type of torque limiter, which is also well known, can be used to allow the lifting apparatus to operate only within a safe range of action as governed by the controller 23. The signals determined and transmitted from the sensor 11, which obviously represent the force acting on the grab, can also be shown in a load display 25 in the event this is required or desirable.

What is only shown and described above in the single FIGURE is the fact that the force acting on the grab is determined via a measurement and transmission link, and wirelessly transmitted to the controller of the lifting apparatus 2 for further processing there. This may be sufficient for many applications. It is generally necessary, however, for the measurement and transmission links to be redundant, that is, to be provided at least in duplicate and independent of each other in order to ensure that no safety-critical state can arise for the lifting apparatus in response to a failure in determining the load and/or in the transmission of the load data to the controller. These two measurement and transmission links can be identical, or they can be provided in forms that differ from each other.

The following discussion again briefly summarizes the prior art and the invention in other words.

The subject matter relates to direct load measurement on the grab of mobile machines. It also applies, however, to stationary equipment. The grabs are typically hooks or other comparable mechanical apparatuses. Previously, no applicable method has been offered that provides this functionality in comprehensive form. In principle, the technology for implementing load measurement is possible today. This has not been implemented, however, due to the previous lack of transmission methods for the load value (or a directly corresponding physical parameter, such as voltage, current, or digitally). Technologies used here to effect load measurement include DMS (strain gauges), SAW (surface-acoustic-wave), or other technologies.

This application describes the application of physical load measurement in connection with the analog or digital evaluator and transmitter, and an "autonomous" and "requisite" source of power to supply all of the electronic components on the grab. The source of power depends on the actual construction and is therefore application specific.

| Reference list |
| --- |
| 1 grab |
| 2 lifting apparatus |
| 3 transmission link |
| 11 sensor |
| 12 analog/digital evaluation unit |
| 13 data preprocessor |
| 14 transmitter |
| 15 power supply |
| 21 data receiver |
| 22 data preprocessor |
| 23 control |
| 24 overload protector |
| 25 load display |

The invention claimed is:

1. An apparatus for determining the force of a lifting apparatus acting on a grab that is movable relative to a component of the lifting apparatus, the apparatus comprising:
 a sensor that determines the force acting on the grab, the sensor mounted on and immovable relative to the grab;
 a transmitter that wirelessly transmits a force-representing signal generated and supplied by the sensor via a surface acoustic wave transmitted along a surface of the lifting apparatus, the acoustic wave carrying the force-representing signal;
 a controller of the lifting apparatus wirelessly linked to the transmitter for receiving the signal carried by the surface acoustic wave; and
 a power supply on the grab that supplies electrical power for the sensor or the transmitter.

2. The apparatus according to claim 1, wherein the sensor is a strain gauge.

3. The apparatus according to claim 1, further comprising a second sensor or transmitter performing redundant functions to the corresponding sensor or transmitter.

4. The apparatus according to claim 1, wherein the power supply is a battery, rechargeable battery, or solar cell.

5. The apparatus according to claim 1, wherein the grab is a hook disposed on a crane cable of a mobile or stationary crane and the hook can be moved through a boom of the crane relative to the boom by the crane cable.

6. The apparatus of claim 1, wherein the transmitter modifies the signal into a second signal based on the determination of the force acting on the grab, the second signal transmitted by the transmitter as an acoustic wave along the surface of the lifting apparatus to the controller.

7. The apparatus of claim 1, wherein the surface acoustic wave is transmitted from the transmitter to the controller across one or more movable joints of the lifting apparatus.

8. A method of determining the force of a lifting apparatus acting on a grab that is movable relative to a component of the lifting apparatus, the method comprising the steps of:
 determining, with a strain gauge sensor attached to and immovable relative to the grab, the force acting on the grab and generating a signal representing the force;
 wirelessly transmitting with a transmitter the signal generated by the sensor to a controller of the lifting apparatus via a surface acoustic wave transmitted along a surface of the lifting apparatus; and
 furnishing from a power supply on the grab electrical power for the sensor or the transmitter.

9. The method according to claim 8, further comprising determining with a second sensor the force acting on the grab and generating a second signal representing the force, the second signal sent redundantly with the signal from the sensor by the transmitter.

10. The method according to claim 8, wherein the grab is a hook disposed on a crane cable of a mobile or stationary crane and the hook can be moved through a boom of the crane relative to the boom by the crane cable.

11. An apparatus for determining the force of a lifting apparatus acting on a grab that is movable relative to a component of the lifting apparatus, the apparatus comprising:
 a transmitter mounted on and immovable relative to the grab, that wirelessly transmits a signal via a surface acoustic wave transmitted along a surface of the lifting apparatus, the acoustic wave carrying the force-representing signal;
 a controller of the lifting apparatus receiving the signal carried by the surface acoustic wave from the transmitter; and
 a power supply on the grab that supplies electrical power for the sensor or the transmitter;
 wherein the controller determines the force on the grab by a change in characteristics of the acoustic wave generated by the transmitter.

* * * * *